United States Patent Office 3,064,060
Patented Nov. 13, 1962

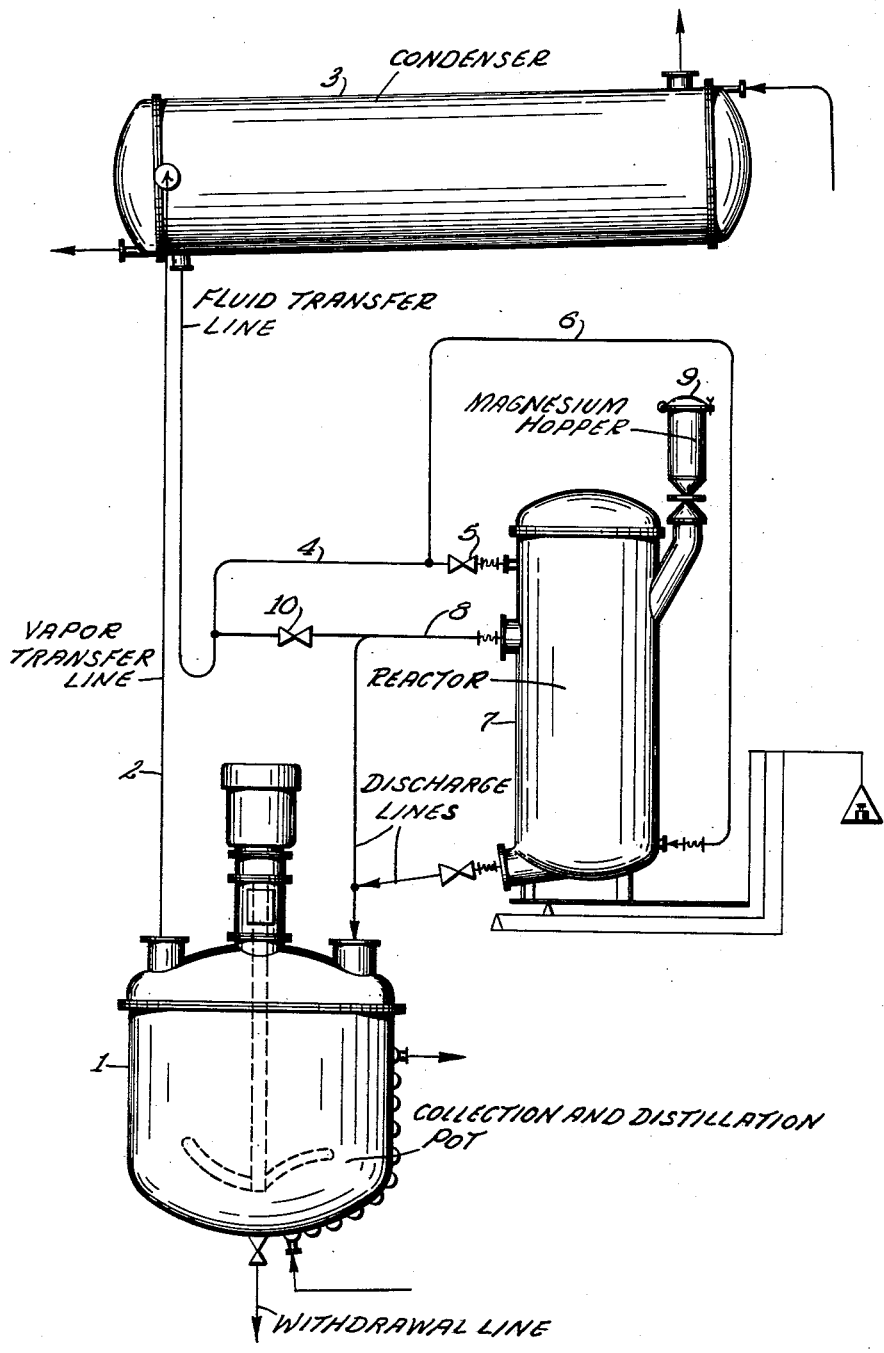

3,064,060
PREPARATION OF GRIGNARD REAGENTS
Jean Battegay, Bottmingen, and Peter Treadwell, Binningen, Switzerland, assignors to Hoffmann-La Roche Inc., Nutley, N.J., a corporation of New Jersey
Filed Mar. 30, 1960, Ser. No. 18,580
Claims priority, application Switzerland Apr. 10, 1959
16 Claims. (Cl. 260—665)

This invention relates to novel chemical processes, and to novel apparatuses in which those processes may be conducted. More particularly, it relates to novel processes and apparatuses for the preparation of Grignard reagents, especially such processes and apparatuses which can be used for operations on a large commercial scale.

Grignard reagents, also called Grignard compounds and organomagnesium halides, have widespread application in organic syntheses and in chemical manufacturing operations. These compounds are conventionally made by reacting an organic halide directly with magnesium metal in an organic liquid medium which is a solvent both for the organic halide starting material and the organomagnesium product. Since the reaction is not only somewhat difficult to initiate and maintain, but also can proceed with great violence if not carefully controlled, cumbersome reaction conditions and elaborate safety precautions have heretofore been deemed necessary, more especially when manufacturing Grignard reagents on a commercial scale. In particular, and among other special measures, it has been recommended to use the magnesium metal in a finely divided form, or at least in a form having a large surface area, such as magnesium powder, magnesium chips or magnesium shavings; and to add the organic halide in small portions, each successive portion being added only after the preceding portion has been fully reacted.

It has now been found, surprisingly, that the metallic magnesium employed in Grignard reactions need not be in a finely divided form or in a form having an extended surface, such as powder, chips or shavings; but on the contrary, can be used in the form of coarse, bulky pieces. Also, it has been found that it is not obligatory to add the organic halide in small portions.

Thus, in one of its aspects, the present invention teaches an improvement in the preparation of Grignard reagents which comprises the use of metallic magnesium reactant in the form of a plurality of coarse, bulky pieces having a size such that at least about 90% of the pieces have a volume per piece greater than about 50 cc. In a related aspect, the invention teaches circulating organic halide continuously, i.e. without metering or apportionment, to such metallic magnesium reactant as described above.

In a preferred mode of execution, the processes of the invention are conducted in a cyclic manner, i.e. by recycling recovered liquid solvent and unreacted organic halide to the reaction. In this embodiment, and employing the above teachings, the invention provides a cyclic process of making Grignard reagents which comprises charging an organic halide and a liquid solvent for Grignard reactions into a reaction zone containing coarse, bulky metallic magnesium pieces of a size such that at least about 90% of the pieces have a volume per piece greater than about 50 cc.; withdrawing from the reaction zone a fluid mixture comprising said liquid solvent, unreacted organic halide and Grignard reagent product; separating from said withdrawn liquid mixture at least a portion of said liquid solvent and of said unreacted organic halide contained therein; and returning the thus separated liquid solvent and unreacted organic halide to said reaction zone.

Although the novel processes of the invention are in principle applicable to the preparation of Grignard reagents from any of the organic halides which are conventionally employed for the preparation of such reagents, it is preferred to employ an organic halide consisting entirely of carbon, hydrogen and a single halogen atom, containing not more than ten carbon atoms, and selected from the group consisting of alkyl-, aryl-, and aralkyl chlorides, bromides and iodides; e.g. methyl bromide, ethyl chloride, ethyl bromide, ethyl iodide, chlorobenzene, bromobenzene, benzyl chloride, p-xylyl bromide, and the like. In this group, when there is no specification as to the particular kind of Grignard reagent desired, it will ordinarily be advantageous to employ a lower alkyl chloride, -bromide or -iodide, so as to produce a lower alkyl magnesium halide. Especially preferred are alkyl chlorides and alkyl bromides each containing from two to four carbon atoms, and in particular ethyl bromide.

By "liquid solvent for Grignard reactions," it is meant to refer to solvents conventionally used for conducting such reactions and particularly to ether or ether-like solvents; e.g. di(lower alkyl) ethers, glycol ethers as referred to in U.S. Patent 2,552,676, and ethers and ether-like compounds referred to generically as "compound Q" in U.S. Patent 2,921,939. Di(lower alkyl) ethers, and especially diethyl ether, however, are ordinarily preferred as solvents to be used in carrying out the processes of the invention.

Whereas the invention embraces broadly the concept of employing coarse, bulky pieces of magnesium having a size such that at least about 90% of the pieces have a volume per piece greater than about t50 cc., it is preferred to employ the magnesium in the form of blocks having a volume per piece between about 1 liter and about 10 liters. The term "block" is used in its ordinary connotation, to denote a bulky, solid piece bounded by one or more planar or approximately planar surfaces, e.g. a cube or other parallelepipedon, or piece approximately in the form of a parallelepipedon. In this usage, the term "block" is employed in contradistinction to "ribbon," "chip," "shaving," "turning," "powder," and the like, which are the forms in which magnesium has heretofore been employed for Grignard reactions.

The size of the magnesium pieces or blocks employed will obviously be determined to some extent by the kind and capacity of the vessel in which the reaction is to be conducted and the amount of fluid to be handled therein. For the manufacture of Grignard reagents on a commercial scale, in vessels having comparatively large capacities, it is preferred to employ magnesium blocks weighing between about 1 kg. and about 20 kg. and preferably between about 2 kg. and about 10 kg. Blocks of magnesium in these ranges are readily available in the form of commercial magnesium bars. These bars can be used either in the form supplied commercially, or after being subdivided (as by cutting) into smaller pieces. Thus, for example, Alabama Metallurgical Corporation, Selma, Alabama, supplies magnesium in the form of 20 lb. "ingots." These can be used in the processes of the invention as such, or can readily be cut up into two, four or more approximately equal pieces. The same company also supplies magnesium in the form of "pigs" weighing approximately 42 lbs., which also can be used as such or after being cut into smaller pieces. The term "commercial magnesium bar," as employed in this specification, is intended to be inclusive of the foregoing "ingots" and "pigs," and similar commercially distributed massive forms of magnesium substantially in the form of a parallelpipedon.

A suitable form of apparatus in which the processes of the invention can be practiced is illustrated diagrammatically in the single FIGURE of the drawing, which discloses a collection and distillation pot 1, provided with a stirrer, and with a jacket for the circulation of heating or cooling fluid. The pot 1 is connected by a vapor transfer line 2 to a condenser 3. The latter is provided with suitable devices for cooling the vapors to be handled therein, and moreover, is vented to the atmosphere. Condenser 3 is connected by a fluid transfer line 4 through a valve 5 to a reactor 7, near the top of the latter. Fluid transfer line 4 is further provided with a branch 6, taken off of line 4 ahead of valve 5, and leading into reactor 7 near the bottom thereof. Reactor 7 is connected through a valved discharge line leading from the bottom of the reactor to the pot 1, and is further provided with an overflow discharge line 8, leading from reactor 7, near the top thereof (but from a point lower than the connection with line 4), to pot 1. A bypass from line 4 also discharges, through a valve 10, into the discharge line leading from reactor 7 into pot 1; so that, if desired, the condensate from condenser 3 can be led directly into pot 1 instead of passing through reactor 7. Reactor 7 is also provided with a hopper 9, connected through a slide valve and a discharge chute with the upper portion of reactor 7. Reactor 7 is further provided with suitable conventional arrangements, shown diagrammatically in the drawing, for weighing the content of magnesium therein. Pot 1 is further provided at the bottom thereof with suitable arrangements (e.g. a valved discharge line) for withdrawing undistilled liquid therefrom.

In one mode of carrying out the processes of the invention, in the apparatus described above, a quantity of organic halide (e.g. ethyl bromide or ethyl chloride) and a quantity of liquid solvent for Grignard reactions (e.g. diethyl ether, dipropyl ether, or tetrahydrofuran) is charged into distillation pot 1. The stirrer is started and heating fluid is circulated through the jacket of pot 1, so as to distill a mixture of organic halide and liquid solvent into condenser 3. In the latter, the distilled vapors are condensed and returned through line 4 and valve 5 into reactor 7, wherein the condensate (organic halide plus liquid solvent) trickles over the magnesium contained in the reactor, the organic halide thus reacting with the magnesium to form Grignard reagent. The liquid mixture comprising solvent, unreacted organic halide and Grignard reagent formed by reaction leaves reactor 7 at the bottom thereof and passes into distillation pot 1. Liquid solvent and organic halide (the unreacted portion of the latter, plus any additional organic halide that has been charged into pot 1) is distilled through line 2, and the cycle is repeated. The Grignard product accumulates in pot 1 and can be withdrawn from the bottom thereof, periodically or as desired. This mode of operation may be referred to as the "trickle procedure."

In a variant mode of operation, the condensed mixture of liquid solvent and organic halide is passed through line 4 and bypass 6 to the bottom of reactor 7, then is passed upward through the reactor, the organic halide thus reacting with the magnesium in reactor 7. The product liquid mixture (comprising Grignard compound formed by reaction, liquid solvent and any unreacted organic halide) overflows through line 8 into pot 1. By distillation from the latter, a vapor mixture of liquid solvent and organic halide is passed through line 2 to condenser 3, and the cycle is repeated. This mode of operation may be identified as the "submersion procedure."

The novel apparatus of the invention, described above, is suitable for carrying out the processes of the invention according to either the "trickle procedure" or the "submersion procedure," at the operator's option.

In a preferred mode of executing the processes of the invention, an excess of magnesium is employed with respect to the organic halide. This excess can be set at any desired figure; for example, it is often convenient to employ a 100% stoichiometric excess. When using an excess of magnesium, the reaction proceeds at a rapid rate until completion thereof. In this mode of execution, it is desirable to ascertain the endpoint of the reaction, i.e. the point at which the theoretical quantity of magnesium has been dissolved. The endpoint can be determined, for example, by measuring the concentration of organic halide in the distillate from pot 1, or by directly weighing the amount of unreacted magnesium in reactor 7.

If desired, the process can be operated in a continuous cycle, by loading magnesium into hopper 9 and thence discharging the magnesium to reactor 7, periodically as the magnesium becomes depleted by reaction with the organic halide; and similarly, by adding organic halide to pot 1, to replace that consumed by reaction with the magnesium to form the Grignard reagent. Liquid solvent can also be added to pot 1, as required for makeup of loss.

It wil be appreciated that temperature control of the reaction is achieved by circulation of the condensate from condenser 3 through reactor 7 to pot 1 and thence back to condenser 3 in a cylic manner. The quantity and temperature of the condensate, and the rate at which it is recirculated to reactor 7, are adjusted so as to prevent excessive temperature rise in the reactor, and moreover so as to maintain the temperature of reaction within a predetermined desired range. The invention teaches broadly, therefore, the improvement in processes for the preparation of Grignard reagents which comprises regulating the temperature of reaction by cylically circulating to the reaction a mixture of liquid solvent and organic halide. In a preferred embodiment, when working with diethyl ether as the specific liquid solvent, the temperature of reaction is maintained between about 30° C. and about 36° C.

From the above, it will be seen that, described generally, an embodiment of the invention especially adapted for operation on a large commercial scale relates to a process which comprises circulating a fluid medium in series through (1) a reaction zone, (2) a distillation zone, and (3) a condensation zone, and back to the reaction zone; said fluid medium being formed initially by charging into the fluid circuit an organic halide and a liquid solvent for Grignard reactions; said reaction zone being charged with metallic magnesium in the form of blocks obtained by subdividing commercial magnesium bars into pieces each weighing between about 1 kg. and about 20 kg.; the temperature in the distillation zone being maintained sufficiently high to distill a mixture comprising said liquid solvent and any unreacted organic halide; the temperature in the condensation zone being low enough to condense substantially all of said distilled solvent and unreacted organic halide without greatly subcooling the same; and the temperature in the reaction zone being maintained at approximately the condensation temperature of the liquid effluent from the condensation zone.

More specifically, and where it is desired to manufacture the common Grignard reagent ethyl magnesium bromide, on a large commercial scale, it is preferred to operate according to a process which comprises circulating a fluid medium in series through (1) a reaction zone, (2) a distillation zone, and (3) a condensation zone, and back to the reaction zone; said fluid medium being formed initially by charging into the fluid circuit ethyl bromide and diethyl ether; said reaciton zone being charged with metallic magnesium in the form of blocks obtained by subdividing commercial magnesium bars into pieces each weighing between about 2 kg. and about 10 kg.; the temperature in the distillation zone being maintained sufficiently high in a range between about 35° C. and about 60° C. to distill a mixture comprising said diethyl ether and unreacted ethyl bromide; the temperature in the condensation zone being such as to condense substantially all of said distilled diethyl ether and ethyl bromide, without greatly subcooling the same; and the temperature in the reaction zone being maintained in a range between about 30° C. and about 36° C.

The invention is further disclosed in the following examples, which are illustrative but not limitative thereof, either as to the processes or apparatuses that can be employed in practicing the invention.

*Example 1.—Trickle Procedure*

In this procedure, carried out in the apparatus shown in the drawing, the entire operation is conducted under nitrogen. First, 70 kg. of magnesium, in the form of oblong blocks weighing approximately 2.5 kg. each, obtained by cutting into quarters magnesium "ingots" each weighing 20 lbs., of the kind described above, are loaded into hopper 9. All of the blocks are allowed to fall onto a supporting grill in reactor 7. The circulation of cooling medium through condenser 3 is started. Then, 155 kg. of ethyl bromide and 300 liters of dry ether are charged into pot 1, the stirrer is started, and water at 50° C. is circulated through the heating jacket. The internal temperature in pot 1 is thus brought to about 35–36° C. Toward the end of the reaction, as the percentage of Grignard reagent in pot 1 increases, it is necessary to raise the temperature of the heating medium in the jacket of pot 1 to about 70° C.

An ether-ethyl bromide mixture is distilled through line 2, and the vapor is liquefied in condenser 3. The liquid mixture thus condensed, at a temperature of about 35° C., flows through fluid supply line 4 and valve 5 and trickles down over the magnesium blocks in reactor 7. The magnesium begins to dissolve forthwith. The rate of distillation from pot 1, and thus the flow of liquid through reactor 7, and the amount of cooling in condenser 3, are so regulated that the temperature of reaction in reactor 7 remains at about 35–36° C.

As the reaction continues, it is necessary to increase the temperature of the water in the heating jacket of pot 1 to about 70° C., so that the internal temperature in the pot increases gradually to 56–57° C.

In order to determine the endpoint, toward the end of the reaction the condensate from 3 is led directly into pot 1 rather than back to reactor 7. The content of organic halide in the distillate cant hen be determined, for example, by measurement of the density of the distillate; or alternatively, the amount of magnesium used up can be determined by weight difference. The reaction is considered complete when the distillate no longer contains organic halide, i.e. when 33 kg. of magnesium have been reacted. The ethyl magnesium bromide contained in pot 1, in ethereal solution, can be withdrawn through the bottom thereof and employed directly for further reaction. The yield, calculated with respect to magnesium, amounts to over 95% of theory.

*Example 2.—Submersion Procedure*

This operation is like that described in Example 1, except that the mixture of diethyl ether and ethyl bromide from condenser 3 is led via fluid lines 4 and 6 to the bottom of reactor 7, and then passes up through magnesium contained in reactor 7. The fluid portion of the reaction mixture leaves reactor 7 via overflow line 8 and flows to pot 1. The latter is heated, as in Example 1, to distill a mixture of diethyl ether and ethyl bromide into condenser 3; the cycle being then repeated until the reaction is completed, the endpoint being determined as in Example 1.

We claim:

1. A cyclic process which comprises charging an organic halide and a liquid solvent for Grignard reactions into a reaction zone containing coarse, bulky metallic magnesium pieces of a size such that at least about 90% of the pieces have a volume per piece greater than about 50 cc.; withdrawing from the reaction zone a fluid mixture comprising said liquid solvent, unreacted organic halide and Grignard reagent product; separating from said withdrawn liquid mixture at least a portion of said liquid solvent and of said unreacted organic halide contained therein; and returning the thus separated liquid solvent and unreacted organic halide to said reaction zone.

2. A process according to claim 1 in which said liquid solvent is a lower aliphatic ether.

3. A process according to claim 1 in which said liquid solvent is diethyl ether.

4. A process according to claim 1 in which said organic halide consists entirely of carbon, hydrogen and a single halogen atom, and contains not more than ten carbon atoms, and is selected from the group consisting of alkyl-, aryl- and aralkyl chlorides, bromides and iodides.

5. A process according to claim 1 in which said organic halide is ethyl bromide.

6. A process according to claim 1 in which the magnesium is in substantial stoichiometric excess with reference to the organic halide.

7. A process according to claim 1 in which substantially all of the magnesium blocks have a volume per piece between about 1 liter and about 10 liters.

8. A process for making Grignard reagents which comprises passing a fluid mixture comprising an organic halide and a liquid solvent for Grignard reactions into a reaction zone charged with metallic magnesium in the form of blocks obtained by subdividing commercial magnesium bars into pieces each weighing between about 1 kg. and about 20 kg.; withdrawing from the reaction zone into a distillation zone a fluid mixture comprising said liquid solvent, unreacted organic halide and Grignard reagent produced by the reaction; distilling from said distillation zone into a condensation zone a vaporous distillate comprising at least a portion of liquid solvent and at least a portion of organic halide contained in said distillation zone; condensing said distillate in said condensation zone; and passing the condensate to said reaction zone.

9. A process according to claim 8 in which the liquid solvent is a lower aliphatic ether.

10. A process according to claim 8 in which the liquid solvent is diethyl ether.

11. A process according to claim 8 in which the organic halide is selected from the group consisting of lower alkyl chlorides, lower alkyl bromides, and lower alkyl iodides.

12. A process according to claim 8 in which the size of blocks is between about 2 kg. and about 10 kg.

13. A process according to claim 8 in which the process is operated in continuous manner, organic halide and magnesium being charged to the process in proportion to the amount of each which is reacted, and without interruption of the reaction.

14. In a process for the preparation of Grignard reagents, the improvement which comprises regulating the temperature of reaction by cylically distilling to the reaction a mixture consisting substantially entirely of liquid solvent for Grignard reactions and organic halide reactant.

15. A process for making Grignard reagents which comprises circulating a fluid medium in series through (1) a reaction zone, (2) a distillation zone, and (3) a condensation zone, and back to the reaction zone; said fluid medium being formed initially by charging into the fluid circuit an organic halide and a liquid solvent for Grignard reactions; said reaction zone being charged with metallic magnesium in the form of blocks obtained by subdividing commercial magnesium bars into pieces each weighing between about 1 kg. and about 20 kg.; the temperature in the distillation zone being maintained sufficiently high to distill a mixture comprising said liquid solvent and any unreacted organic halide; the temperature in the condensation zone being low enough to condense substantially all of said distilled solvent and unreacted organic halide without greatly subcooling the same; and the temperature in the reaction zone being maintained at approximately the condensation temperature of the liquid effluent from the condensation zone.

16. A process for making Grignard reagents which comprises circulating a fluid medium in series through (1) a reaction zone, (2) a distillation zone, and (3) a condensation zone, and back to the reaction zone; said fluid medium being formed initially by charging into the fluid circuit ethyl bromide and diethyl ether; said reaction zone being charged with metallic magnesium in the form of blocks obtained by subdividing commercial magnesium bars into pieces each weighing between about 2 kg. and about 10 kg.; the temperature in the distillation zone being maintained sufficiently high in a range between about 35° C. and about 60° C. to distill a mixture comprising said diethyl ether and unreacted ethyl bromide; the temperature in the condensation zone being such as to condense substantially all of said distilled diethyl ether and ethyl bromide, without greatly subcooling the same; and the temperature in the reaction zone being maintained in a range between about 30° C. and about 36° C.

References Cited in the file of this patent

UNITED STATES PATENTS

| | | |
|---|---|---|
| 2,066,198 | Buc | Dec. 29, 1936 |
| 2,552,676 | Hill | May 15, 1951 |
| 2,918,425 | Berger et al. | Dec. 22, 1959 |